United States Patent Office 3,462,442
Patented Aug. 19, 1969

3,462,442
2-SUBSTITUTED-3-QUINUCLIDINONES
John H. Biel and Harvey B. Hopps, Milwaukee, Wis., assignors to Aldrich Chemical Company, Inc., Milwaukee, Wis., a corporation of Wisconsin
No Drawing. Filed Dec. 20, 1965, Ser. No. 515,183
Int. Cl. C07d 57/00, 29/30, 39/06
U.S. Cl. 260—294          12 Claims

ABSTRACT OF THE DISCLOSURE 2-substituted-3-quinuclidinones of the formula

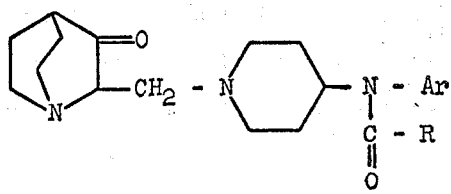

wherein R and Ar are as described below possess antidepressant activity and are useful for treating depression in mammals.

This invention relates to novel compounds. More particularly, this invention relates to novel compounds which possess valuable therapeutic utility as antidepressants, and to processes and intermediates useful in the preparation thereof. In another aspect, this invention relates to a novel method of treating psychic depression.

It is an object of the present invention to provide a new class of therapeutic compounds. It is another object of the present invention to provide novel compounds having antidepressant activity. It is a further object of the present invention to provide a process for preparing the novel therapeutic compounds and to provide intermediates useful in the preparation thereof. It is still a further object of the present invention to provide a novel method of treating psychic depression.

These and other objects which may appear as the specification proceeds are achieved by this invention which comprises the provision of compounds selected from the group consisting of compounds having the following formula, I

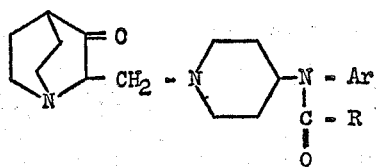

and the pharmaceutically acceptable nontoxic salts thereof, wherein Ar is a member selected from the group consisting of naphthyl, pyridyl and a radical of the formula II

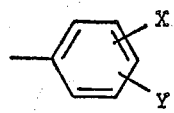

wherein X and Y are each a member selected from the group consisting of hydrogen, chloro, bromo, iodo, fluoro, trifluoromethyl, (lower)alkyl, (lower)alkoxy, di(lower)alkylsulfonyl, (lower)alkylthio, phenyl, phenoxy, phenylamino, benzyl and when taken together, methylenedioxy.

R is a member selected from the group consisting of (lower)alkyl, (lower)alkenyl, (lower)alkynyl, and cycloalkyl radicals having from 3 to 7 carbon atoms, inclusive, e.g. cyclopropyl, cyclobutyl, cyclopentyl, cyclohexyl and cycloheptyl.

The quinuclidinone moiety (a) of the compounds described herein is represented throughout this specification as (b).

(a)                     (b)

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

The term "(lower)alkynyl" as used herein means both straight and branched chain alkynyl radicals containing from 2 to 8 carbon atoms, e.g. ethinyl, propargyl, 1-butinyl, 2-butinyl, 1,1-dimethylpropargyl, 1-pentinyl, 1-heptinyl, etc.

Similarly, where the term "(lower)" is used as part of the description of another group, e.g., (lower)alkoxy, it refers to the alkyl portion of such group which is therefore as described in connection with "(lower) alkyl."

A preferred embodiment of the present invention consists of the compounds of the formula III

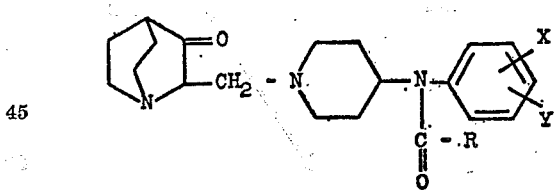

and the nontoxic salts thereof, wherein X, Y and R are as represented above.

A particularly desirable group of compounds of those represented by Formula I are the compounds in which X and Y represent hydrogen, chloro, bromo, fluoro, trifluoromethyl, (lower)alkyl, (lower)alkoxy, and R is (lower)alkyl.

The compounds of this invention are valuable pharmaceutical agents. They exert an antidepressant effect in animals, and are therefore useful as antidepressant agents.

The antidepressant effect of the compounds of this invention is demonstrated by their ability to prevent the sedative effects of reserpine in mice. Oral administration of as little as 12.5 mg./kg. of the preferred compound of the present invention 2-[4'-(N-propionylanilino)piperidino]methyl-3-quinuclidinone, in mice three hours before intravenous administration of 5 mg./kg. of reserpine completely prevented symptoms usually associated with reserpine administration, i.e., increased motor activity, profuse salivation and ptosis. Thus, the preferred compound of the present invention exhibits marked antidepressant activity.

The compounds of this invention can be prepared by reacting a 4-(acylamino)piperidine of the formula

IV

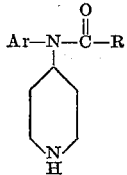

with 2-methylene-3-quinuclidinone

V

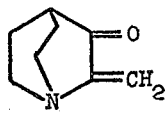

in a suitable solvent medium, such as methanol, ethanol, dimethylformamide, benzene, dimethylsulfoxide and the like, at room or elevated temperatures.

Many of the starting 4-(N-acylamino)piperidines are described in French Patent No. 1,344,366 and in United States Patent No. 3,161,637. The general procedures described therein are useful in preparing other 4-(N-acylamino)piperidines.

2-methylene-3-quinuclidinone is a novel intermediate for the preparation of the quinuclidiones of Formula I, and is prepared via the following series of reactions:

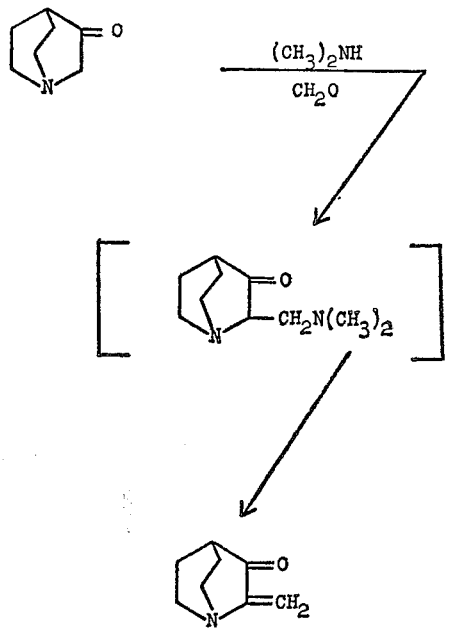

3-quinuclidinone is reacted with dimethylamine and formaldehyde, and upon heating, e.g., at reflux temperature, the intermediate Mannich base undergoes spontaneous deamination to produce 2-methylene-3-quinuclidinone.

Representative of the 4-(N-acylanilino)piperidines which may be used in the aforedisclosed process for preparing the compounds of this invention are:

4-(N-acetylanilino)piperidine
4-(N-propionylanilino)piperidine
4-(N-acryloylanilino)piperidine
4-(N-propiolylanilino)piperidine
4-(N-cyclopropionylanilino)piperidine
4-(N-cyclobutanoylanilino)piperidine
4-(N-propionyl-3-trifluoromethylanilino)piperidine
4-(N-propionyl-4-chloroanilino)piperidine
4-(N-(propionyl-4-methoxyanilino)piperidine
4-(N-cyclopropionyl-4-fluoroanilino)piperidine
4-(N-cyclopropionyl-4-phenylanilino)piperidine
4-(N-cyclopropionyl-4-phenoxyanilino)piperidine
4-(N-cyclopropionyl-4-phenylaminoanilino)piperidine Representative of the compounds of this invention are:

2-[4'-(N-acetylanilino)piperidino]methyl-3-quinuclidinone
2-[4'-(N-acryloylanilino)piperidino]methyl-3-quinuclidinone
2-[4'-(N-propiolylanilino)piperidino]methyl-3-quinuclidinone
2-[4'-(N-cyclobutylcarbonylanilino)piperidino]methyl-3-quinuclidinone
2-[4'-(N-propionyl-3-trifluoromethylanilino)piperidino]methyl-3-quinuclidinone
2-[4'-(N-propionyl-4-chloroanilino)piperidino]methyl-3-quinuclidinone
2-[4'-(N-propionyl-4-methoxyanilino)piperidino]methyl-3-quinuclidinone
2-[4'-(N-cyclopropylcarbonyl-4-fluoroanilino)piperidino]methyl-3-quinuclidinone
2-[4'-(N-cyclopropylcarbonyl-4-phenylanilino)piperidino]methyl-3-quinuclidinone
2-[4'-(N-cyclopropylcarbonyl-4-phenoxyanilino)piperidino]methyl-3-quinuclidinone
2-[4'-(N-cyclopropylcarbonyl-4-phenylaminoanilino)piperidino]methyl-3-quinuclidinone The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally, in an effective amount, are effective in the treatment of psychic depression.

The following examples are intended to illustrate the invention described herein without unduly restricting it.

EXAMPLE 1

Preparation of 2-methylene-3-quinuclidinone

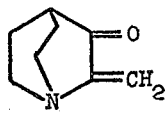

A solution of 3-quinuclidinone (50 gm., 0.4 mol), 37% aqueous formaldehyde (50 gm., 0.6 mol), 40% aqueous dimethylamine (68 gm., 0.6 mol), and absolute ethanol (70 ml.) was heated at reflux for 22 hours. The solution was concentrated at reduced pressure to a residue which was distilled at reduced pressure. The fraction boiling at 90–110°/10 mm., 2-methylene-3-quinuclidinone was recovered and weighed 43 gm.

EXAMPLE 2

Preparation of 2-[4'-(N-propionylanilino)piperidino]-methyl-3-quinuclidinone

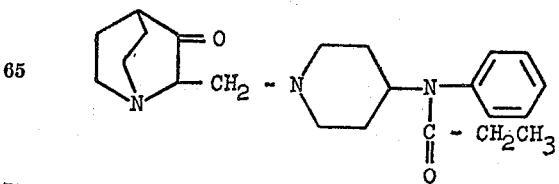

A solution of 2-methylene-3-quinuclidinone (5.48 gm., 0.04 mol) and 4-(N-propionylanilino)piperidine (9.28 gm., 0.04 mol) in 100 ml. of methanol was allowed to stand for 24 hours. The solvent was evaporated, and the product, 2-[4'-(N-propionylanilino)piperidino]methyl-3- quinuclidinone, crystallized from ethanol and ether; M.P. 123–124° C.

*Analysis.*—Calc'd for $C_{22}H_{31}N_3O_2$: C, 71.51%; H, 8.46%; N, 11.37%. Found: C, 72.08%; H, 8.28%; N, 11.11%.

EXAMPLE 3

Preparation of 2-[4'-(N-cyclopropylcarbonylanilino)-piperidino]methyl-3-quinuclidinone

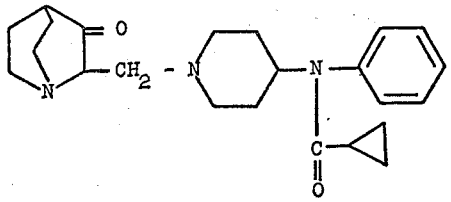

A mixture of 2-methylene-3-quinuclidinone (1.37 gm., 0.01 mol), and 4-(N'-cyclopropylcarbonylanilino)piperidine (2.44 gm., 0.01 mol) in methanol was allowed to stand at room temperature for 48 hours, then evaporated. The residue was triturated with dry ether to give 1.5 gm. of the product, 2-[4' - (N-cyclopropylcarbonylanilino)piperidino]methyl-3-quinuclidinone, M.P. 129–131° C.

*Analysis.*—Calc'd for $C_{23}H_{31}N_3O_2$: C, 72.41%; H, 8.19%; N, 11.02%. Found: C, 71.87%; H, 8.29%; N, 11.26%.

EXAMPLE 4

When, in the procedure of Example 2, 4-(N-propionylanilino)piperidine is replaced by an equal molar amount of 4-(N-acetylanilino)piperidine,
4-(N-acryloylanilino)piperidine,
4-(N-propiolylanilino)piperidine,
4-(N-cyclobutylcarbonylanilino)piperidine,
4-(N-propionyl-3-trifluoromethylanilino)piperidine,
4-(N-propionyl-4-chloroanilino)piperidine,
4-(N-propionyl-4-methoxyanilino)piperidine,
4-(N-cyclopropylcarbonyl-4-fluoroanilino)piperidine,
4-(N-cyclopropylcarbonyl-4-phenylanilino)piperidine,
4-(N-cyclopropylcarbonyl-4-phenoxyanilino)piperidine,
4-(N-cyclopropylcarbonyl-4-phenylaminoanilino)piperidine,
4-[N-(1-naphthyl)propionamido]piperidine,
4-[N-(2-naphthyl)propionamido]piperidine,
4-[N-(1-naphthyl)cyclopropylcarboxamido]piperidine,
4-[N-(2-naphthyl)cyclopropylcarboxamido]piperidine,
4-[N-(1-pyridyl)propionamido]piperidine,
4-[N-(1-pyridyl)cyclopropylcarboxamido]piperidine,
4-(N-propionyl-3-chloroanilino)piperidine,
4-(N-propionyl-4-trifluoromethylanilino)piperidine,
4-(N-propionyl-2-bromoanilino)piperidine,
4-(N-propionyl-4-methylanilino)piperidine,
4-(N-propionyl-3-iodoanilino)piperidine,
4-(N-propionyl-3-ethylanilino)piperidine,
4-(N-propionyl-4-propylanilino)piperidine,
4-(N-propionyl-4-methoxyanilino)piperidine,
4-(N-propionyl-4-ethoxyanilino)piperidine,
4-(N-propionyl-3-methylthioanilino)piperidine,
4-(N-propionyl-2,6-dichloroanilino)piperidine,
4-(N-propionyl-2-chloro-4-methylanilino)piperidine,
4-(N-propionyl-4-phenylanilino)piperidine,
4-(N-propionyl-4-phenoxyanilino)piperidine,
4-(N-propionyl-4-benzylanilino)piperidine,
4-(N-propionyl-3,4-methylenedioxyanilino)piperidine,
4-(N-propionyl-3-dimethylsulfamylanilino)piperidine,
4-(N-cyclopentylcarbonylanilino)piperidine,
4-(N-cyclohexylcarbonylanilino)piperidine,
4-(N-cycloheptylcarbonylanilino)piperidine,
4-(N-hexanoylanilino)piperidine,
4-(N-butyrylanilino)piperidine,
4-(N-octanoylanilino)piperidine,
4-(N-crotonoylanilino)piperidine,
4-(N-heptanoylanilino)piperidine,
4-(N-isobutyrylanilino)piperidine,
4-(N-methacryloylanilino)piperidine, and
4-(N-valerylanilino)piperidine, there are obtained, 2-[4'-(N-acetylanilino)piperidino]methyl-3-quinuclidinone,
2-[4'-(N-acryloylanilino)piperidino]methyl-3-quinuclidinone,
2-[4'-(N-propiolylanilino)piperidino]methyl-3-quinuclidinone,
2-[4'-(N-cyclobutylcarbonylanilino)piperidino]methyl-3-quinuclidinone,
2-[4'-(N-propionyl-3-trifluoromethylanilino)piperidino]-methyl-3-quinuclidinone,
2-[N-propionyl-4-chloroanilino)piperidino]methyl-3-quinuclidinone,
2-[4'-(N-propionyl-4-methoxyanilino)piperidino]methyl-3-quinuclidinone,
2-[4'-(N-cyclopropylcarbonyl-4-fluoroanilino)piperidino]methyl-3-quinuclidinone,
2-[4'-(N-cyclopropylcarbonyl-4-phenylanilino)piperidino]methyl-3-quinuclidinone,
2-[4'-(N-cyclopropylcarbonyl-4-phenoxyanilino)piperidino]methyl-3-quinuclidinone,
2-[4'-(N-cyclopropylcarbonyl-4-phenylaminoanilino)piperidino]methyl-3-quinuclidinone,
2-{4'-[N-(1-naphthyl)propionamido]piperidino}methyl-3-quinuclidinone,
2-{4'-[N-(2-naphthyl)propionamido]piperidino}methyl-3-quinuclidinone,
2-{4'-[N-(1-naphthyl)cyclopropylcarboxamido]piperidino}-methyl-3-quinuclidinone,
2-{4'[N-(2-naphthyl)cyclopropylcarboxamido]piperidino}-methyl-3-quinuclidinone,
2-{4'-[N-(1-pyridyl)propionamido]piperidino}methyl-3-quinuclidinone,
2-{4'-[N-(1-pyridyl)cyclopropylcarboxamido]piperidino}-methyl-3-quinuclidinone,
2-[4'-(N-propionyl-3-chloroanilino)piperidino]methyl-3-quinuclidinone,
2-[4'-(N-propionyl-4-trifluoromethylanilino)piperidino]-methyl-3-quinuclidinone,
2-[4'-(N-propionyl-2-bromoanilino)piperidino]methyl-3-quinuclidinone,
2-[4'-(N-propionyl-4-methylanilino)piperidino]methyl-3-quinuclidinone,
2-[4'-(N-propionyl-3-iodoanilino)piperidino]methyl-3-quinuclidinone,
2-[4'-(N-propionyl-3-ethylanilino)piperidino]methyl-3-quinuclidinone,
4-[4'-(N-propionyl-4-propylanilino)piperidino]methyl-3-quinuclidinone,
2-[4'-(N-propionyl-4-methoxyanilino)piperidino]methyl-3-quinuclidinone,
2-[4'-(N-propionyl-4-ethoxyanilino)piperidino]methyl-3-quinuclidinone,
2-[4'-(N-propionyl-3-methylthioanilino)piperidino]methyl-3-quinuclidinone,
2-[4'(N-propionyl-2,6-dichloroanilino)piperidino]methyl-3-quinuclidinone,
2-[4'-(N-propionyl-2-chloro-4-methylanilino)piperidino]methyl-3-quinuclidinone,
2-[4'-(N-propionyl-4-phenylanilino)piperidino]methyl-3-quinuclidinone,
2-[4'-(N-propionyl-4-phenoxyanilino)piperidino]methyl-3-quinuclidinone,
2-[4'-(N-propionyl-4-benzylanilino)piperidino]methyl-3-quinuclidinone,
2-[4'-(N-propionyl-3,4-methylenedioxyanilino)piperidino]-methyl-3-quinuclidinone,
2-[4'-(N-propionyl-3-dimethylsulfamylanilino)piperidino]-methyl-3-quinuclidinone, 2-[4'-(N-cyclopentylcarbonylanilino)piperidino]methyl-3-quinuclidinone,
2-[4'-(N-cyclohexylcarbonylanilino)piperidino]methyl-3-quinuclidinone,
2-[4'-(N-cycloheptylcarbonylanilino)piperidino]methyl-3-quinuclidinone,
2-[4'-(N-hexanoylanilino)piperidino]methyl-3-quinuclidinone,
2-[4'-(N-butyrylanilino)piperidino]methyl-3-quinuclidinone,
2-[4'-(N-octanoylanilino)piperidino]methyl-3-quinuclidinone,
2-[4'-(N-crotonylanilino)piperidino]methyl-3-quinuclidinone,
2-[4'-(N-heptanoylanilino)piperidino]methyl-3-quinuclidinone,
2-[4'-(N-isobutyrylanilino)piperidino]methyl-3-quinuclidinone,
2-[4'-(N-methacryloylanilino)piperidino]methyl-3-quinuclidinone and
2-[4'-(N-valerylanilino)piperidino]methyl-3-quinuclidinone, respectively.

While the foregoing invention has been described and exemplified in terms of its preferred embodiment, those skilled in the art will appreciate that modifications can be made without departing from the spirit and scope of this invention.

We claim:

1. A compound selected from the group consisting of compounds of the formula

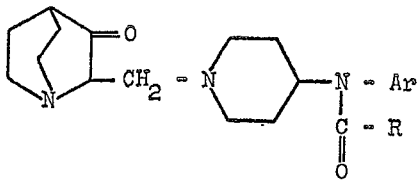

wherein

Ar is a member selected from the group consisting of naphthyl, pyridyl and a radical of the formula

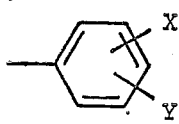

wherein X and Y are each a member selected from the group consisting of hydrogen, chloro, bromo, iodo, fluoro, trifluoromethyl, (lower)alkyl, (lower)alkoxy, di(lower)alkylsulfamyl, (lower)alkylthio, phenyl, phenoxy, phenylamino, benzyl and when taken together, methylenedioxy, and R is a member selected from the group consisting of (lower)alkyl, (lower)alkenyl, (lower)alkynyl and cycloalkyl radicals having from 3 to 7 carbon atoms inclusive;

and the pharmaceutically acceptable nontoxic salts thereof.

2. A compound of claim 1 having the formula

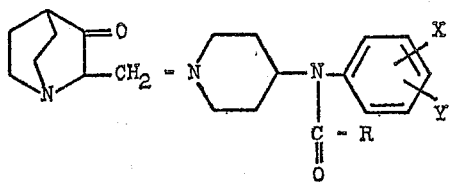

wherein

X and Y are each a member selected from the group consisting of hydrogen, chloro, bromo, iodo fluoro, trifluoromethyl, (lower)alkyl, (lower)alkoxy, di-(lower)alkylsulfamyl, (lower)alkylthio, phenyl, phenoxy, phenylamino, benzyl and when taken together, methylenedioxy, and R is a member selected from the group consisting of (lower)alkyl, (lower)alkenyl, (lower)alkynyl and cycloalkyl radicals having from 3 to 7 carbon atoms inclusive.

3. A compound of claim 1 having the formula

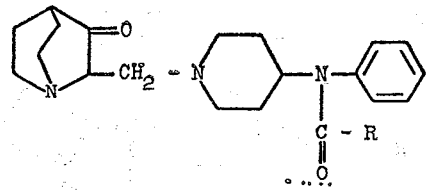

wherein R is (lower)alkyl.

4. The compond of claim 1 having the formula

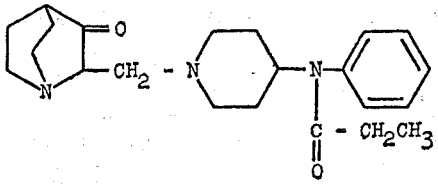

5. The compound of claim 1 having the formula

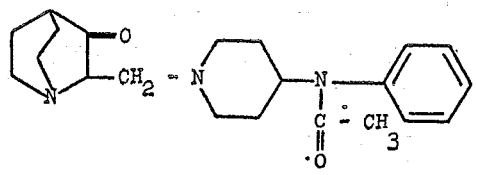

6. The compound of claim 1 having the formula

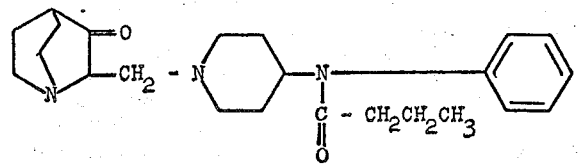

7. The compound of claim 1 having the formula

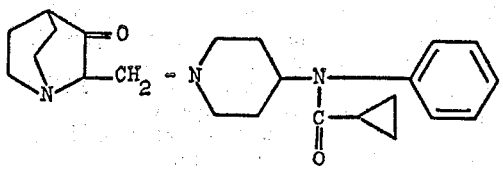

8. The compound of claim 1 having the formula

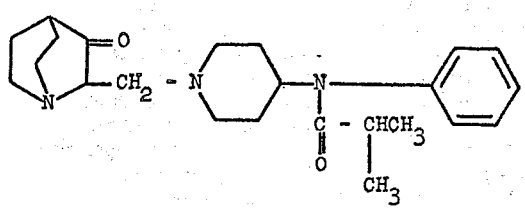

9. The compound of claim 1 having the formula

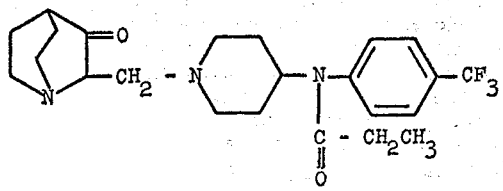

10. The compound of claim 1 having the formula
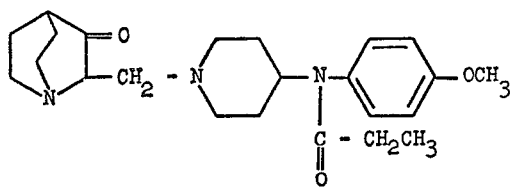
11. The compound of claim 1 having the formula
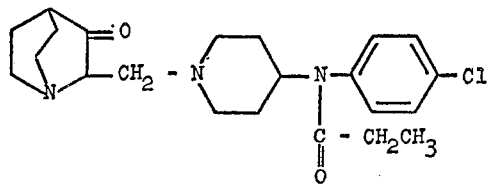
12. The compound of claim 1 having the formula
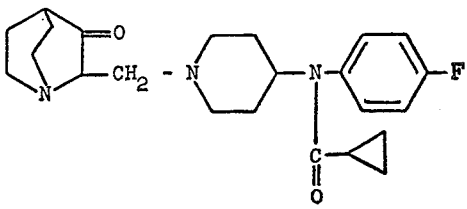
References Cited
UNITED STATES PATENTS
3,384,641   5/1968   Biel et al. _____ 260—294.7
JOHN D. RANDOLPH, Primary Examiner
U.S. Cl X.R.
260—294.7, 999